US005751437A

United States Patent [19]
Parker et al.

[11] Patent Number: 5,751,437
[45] Date of Patent: May 12, 1998

[54] DEVELOPMENT COMBINATION EXPOSURE AND RECHARGE SCHEME TO ELIMINATE DEVELOPMENT DEFECTS IN TWO PASS PROCESS COLOR XEROCOLOGRAPHY

[75] Inventors: Delmer G. Parker, Rochester, N.Y.; Gregory J. Kovacs, Mississauga, Canada

[73] Assignee: Xerox Corporation, Stamford, Conn.

[21] Appl. No.: 786,544

[22] Filed: Jan. 21, 1997

[51] Int. Cl.[6] .................... H04N 1/29; G03G 15/01
[52] U.S. Cl. .................... 358/300; 399/184; 347/232
[58] Field of Search .................... 358/300, 296, 358/464, 500, 501; 399/130, 177, 184; 347/112, 115, 118, 232

[56] References Cited

U.S. PATENT DOCUMENTS

| 4,868,611 | 9/1989 | Germain | 355/328 |
| 5,347,303 | 9/1994 | Kovacs et al. | 346/157 |
| 5,444,463 | 8/1995 | Kovacs et al. | 347/118 |

*Primary Examiner*—Eric Frahm

[57] ABSTRACT

Full color, single pass and two-pass imaging processes using black, magenta, cyan and yellow toners and Non-interactive Development without fringe field development. Corona discharge is utilized for voltage leveling certain developed images prior to their passage through DAD developer housings. A Raster Output Scanner (ROS) used for creating the latent electrostatic images is also used for voltage leveling of images developed on the first pass of the two pass imaging process in order to remove certain other images for eliminating fringe field images as well as other undesired images.

20 Claims, 6 Drawing Sheets

DEVELOPMENT COMBINATION EXPOSURE AND RECHARGE SCHEME TO ELIMINATE DEVELOPMENT DEFECTS IN TWO PASS PROCESS COLOR XEROCOLOGRAPHY

BACKGROUND OF THE INVENTION

This invention relate to a full color, xerographic printing system using a Raster Output Scanning (ROS) system incorporating a dual wavelength laser diode source for the ROS and charge retentive surface response to the two wavelengths and, more particularly, to a full color, two-pass imaging process using black, magenta, cyan and yellow toners and Non-Interactive Development without fringe field development.

Xerocolography (dry color printing) is a color printing architecture which combines multi-level xerographic development with multiwavelength laser diode light sources, with a multiwavelength single polygon, single optics ROS and with a multiwavelength, multilayered photoreceptor to provide color printing in either a single or two pass. Inherently perfect registration is achieved since the various color images are all written at the same imaging station with the same ROS.

Present implementation of xerocolography uses a dual wavelength system. Semiconductor laser material systems are currently available for making the required light sources with IR and red light emissions, and high performance devices have been fabricated. Photoreceptor material systems are currently available for making the required IR + red sensitive devices and high performance systems have been demonstrated with the mainline photoreceptor materials for ongoing developments, viz. BZP (benzimidazole perylene) and GaOHPc (hydroxygallium phthalocyanine).

Xerocolography is capable of producing either highlight color or process color images in a single pass as well as process color images in multiple passes. In creating full process color images, using Image On Image (IOI) imaging, toner particles are deposited on already developed toner images. In this imaging mode it is desirable to use Non-Interactive Development (NID) in order to avoid scavenging of an already developed image.

In order to use Non-Interactive Development (NID) systems for creating IOI images, it is necessary to eliminate developed image fringe fields and/or preclude the formation of images having fringe fields which can not be eliminated. In the past, the problem of fringe field development has been obviated using voltage leveling corona devices such as a scorotron after one image development and prior to a subsequent image development on an already developed image in order to effect complete voltage neutralization of previously developed images thereby eliminating the fringe fields.

Following is a discussion of prior art, incorporated herein by reference, which may bear on the patentability of the present invention. In addition to possibly having some relevance to the question of patentability, these references, together with the detailed description to follow, are intended to provide a better understanding and appreciation of the present invention.

U.S. Pat. No. 4,868,611 entitled "Tri-Level Xerography Scorotron Neutralization Concept" granted to Richard P. Germain on Sep. 19, 1989 discloses the use of a scorotron after the development of a first image. The scorotron serves to bring that first image to complete charge neutralization which removes the voltage responsible for the fringe fields thereby precluding fringe field development during the development of a subsequent image.

U.S. Pat. No. 5,347,303 entitled "Full Color Xerographic Printing System With Dual Wavelength, Single Optical System ROS And Dual Layer Photoreceptor" granted on Sep. 13, 1994 to Kovacs et al discloses a full color xerographic printing system, either two pass or single pass, with a single polygon, single optical system Raster Output Scanning (ROS) system has a dual wavelength laser diode source for the ROS which images the dual beams at a single station as closely spaced spots or at two stations as closely spaced spots on a dual layer photoreceptor with each photoreceptor layer sensitive to or accessible by only one of the two wavelengths.

U.S. Pat. No. 5,444,463 entitled "Color Xerographic Printing System With Dual Wavelength, Single Optical System ROS And Dual Layer Photoreceptor" granted on Aug. 22, 1995 to Kovacs et al discloses a single pass color xerographic printing system. This printing system with a single polygon, single optical system Raster Output Scanning (ROS) system has a dual wavelength laser diode source for the ROS which images the dual beams at a single station as closely spaced spots on a dual layer photoreceptor.

U.S. Pat. application Ser. No. 07/345,045 entitled "Development Scheme For Three Color Highlight Color Tri-level Xerography discloses a method and apparatus wherein the creation of multiple color images is accomplished in a single pass utilizing a multilayered photoreceptor structure having layers which are responsive to different wavelength lasers. A composite image including three images areas is formed with substantially perfect registration. A CAD and DAD image are developed using CMB development and a second DAD image is developed using an NID development system. Development of the second DAD image without developing halos around the CAD image is effected by recharging the photoreceptor prior to development of the second DAD image.

BRIEF DESCRIPTION OF THE INVENTION

In accordance with the present invention, a full color, two-pass imaging process using black, magenta, cyan and yellow toners and Non-interactive Development without fringe field development is provided. To this end corona discharge is utilized in the manner described in the references noted above. That is, corona discharge is utilized to fully voltage level some of the already developed images prior to the development of subsequent images.

In addition to the use of corona discharge for effecting voltage leveling, the Raster Output Scanner (ROS) used for creating the latent electrostatic images is also used for voltage leveling of an image developed on the first pass. In particular, the voltage in photoreceptor areas corresponding to black toner images which have been recharged prior to the second pass are leveled using the 830nm wavelength of the ROS of a dual wavelength ROS.

Fringe field development is further precluded by forming, in a second pass of a two pass imaging process, only images which do not have fringe fields that could be developed. As will be appreciated, in a two pass, full color imaging system using black, magenta, cyan and yellow toners it is possible to form images in different ways some of which would present fringe fields at subsequent development stations and others which would not. In accordance with the present invention, those images which would result in fringe fields are not formed. They are precluded using the ROS to discharge those image areas to the background or other suitable voltage level prior to the second pass.

3

In addition to eliminating images that present fringe fields, it is also desirable to preclude development of IOI using the same color toners. This is accomplished by not forming those images which would lead to development of one color toner on top of the same color toner. The reason for the forgoing is that there are other ways of forming images of that color and that the resultant gloss of images developed with a double thickness of the same color toner would be different than the rest of the images.

DETAILED DESCRIPTION OF THE PREFERRED EMBODIMENT OF THE INVENTION

Figure 1:
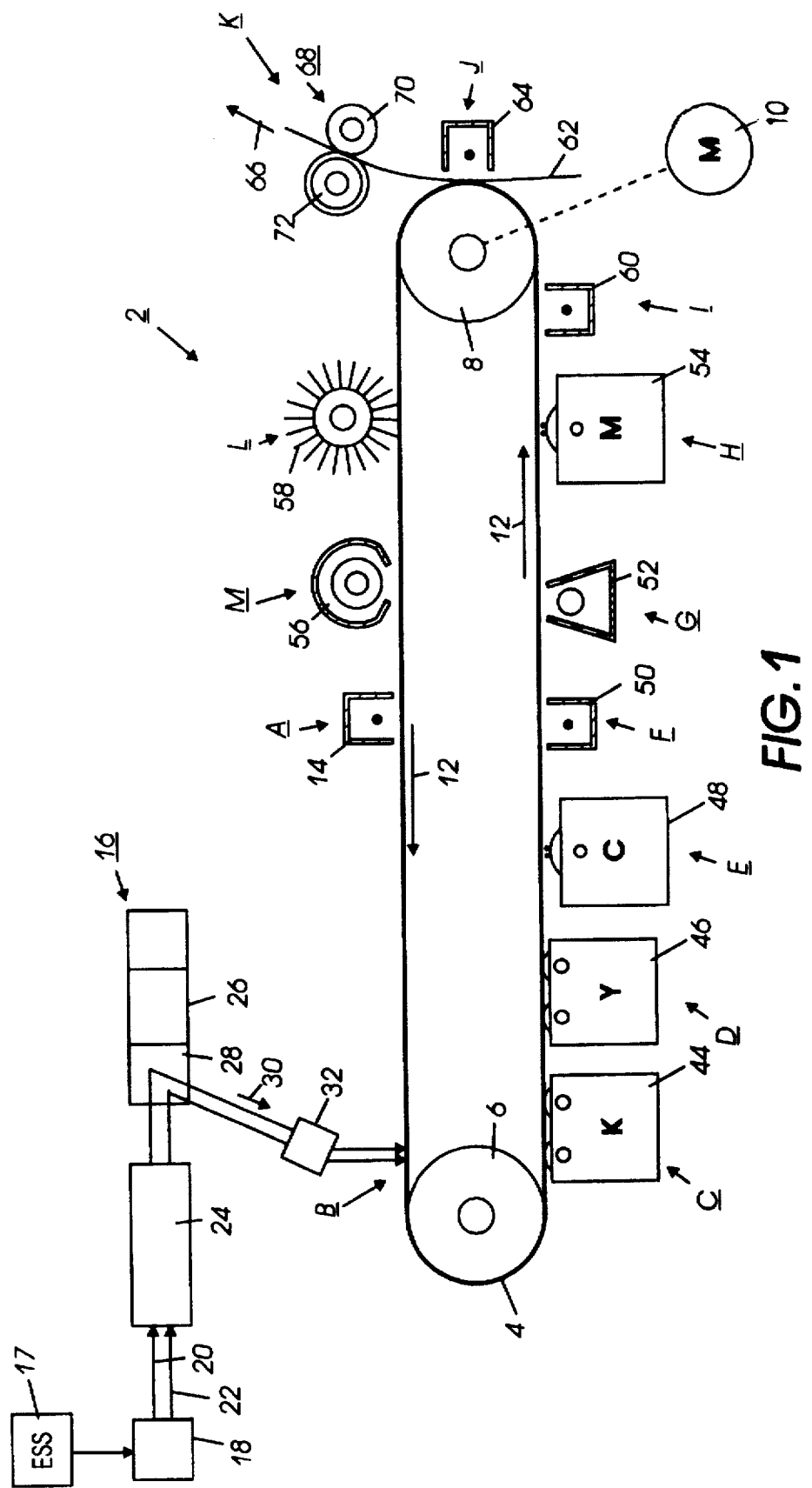
FIG. 1 is a schematic illustration of a two pass xerographic printing system.

In FIG. 1 there is illustrated a two pass xerographic printing system 2 representing one embodiment of the invention. The printing system utilizes a charge retentive member in the form of a photoconductive belt 4 comprising two photoconductive layers and an electrically conductive substrate. The belt 4 is mounted for sequential movement past a charging station A, an exposure station B, a first development station C, a second development station D, a third development station E, a voltage leveling station F, a uniform exposure station G, a fourth development station H, a pre-transfer charging station 1, a transfer station J, a fusing station K, a cleaning station L and an erasure/exposure station M. The belt moves in the direction of arrow 12 to advance successive portions of the belt sequentially through the various processing stations positioned about the path of movement thereof for forming images in two passes of the belt through the aforementioned process stations, A through M.

The belt 4 is entrained about a plurality of rollers 6 and 8, the latter of which is used as a drive roller and the others of which can be used to provide suitable tensioning of the photoreceptor belt 4. A motor 10 rotates the drive roller 8 to advance the belt 4 in the direction of arrow 12. The drive roller is operatively coupled to the motor by suitable means such as a drive belt.

Initially successive portions of belt 4 pass through charging station A, where a corona discharge device such as a scorotron, corotron, or dicorotron, indicated generally by the reference numeral 14, charges the belt 4 to a selectively high uniform positive or negative potential, $V_O$ of approximately −800 volts. Any suitable control circuit, well known in the art, may be employed for controlling the corona discharge device 14.

Next, the charged portions of the photoreceptor surface are advanced through exposure station B. At exposure station B, the uniformly charged photoreceptor or charge retentive surface 4 is exposed to a dual wavelength ROS device 16 to form a tri-level image. A tri-level image is one containing fully charged areas, fully discharged areas and those areas which have been discharged to $V_O/2$. The fully charged areas are subsequently developed using Charged Area Development (CAD) with black toner according to the scheme in FIG. 4 while the discharged areas are developed using Discharged Area Development (DAD) with magenta toner according to the scheme in FIG. 4. The photoreceptor can be discharged to $V_O/2$ by individual exposure with either the red or infrared beam. Exposure with the red beam only will yield a white area according to the scheme in FIG. 4. Exposure with the infrared beam only will eventually yield a DAD cyan image after the flood exposure step effected in Station G of FIG. 1. An Electronic Subsystem (ESS) 17 converts previously stored image information into appropriate control signals for the ROS output in an imagewise fashion. Thus, in the absence of an image signal, the ROS has both laser beams off over a given area whereby a CAD image is formed representing one image color. For information corresponding to a second color image the ROS has both laser beams on over a given area for forming DAD images. For information corresponding to the white area the red laser beam only is on. For information corresponding to the second DAD color the IR laser beam only is on. The image data acquisition, data storage, and computation under the control of the ESS 17 are well within the capabilities of present and future microprocessor-based machine controllers and do not represent part of the invention.

The Raster output scanner 16 uses a dual wavelength hybrid laser semiconductor structure 18 consisting of a 670 nm wavelength laser emitter such as a semiconductor structure of AlGaInP and a 830 nm laser emitter such as a semiconductor structure of AlGaAs, both laser emitter structures being known to those of ordinary skill in the art. Light Emitting Diodes (LED) may also be employed.

The different wavelength beams may be tangentially offset and are scanned sequentially over top of each other on the photoreceptor on the same scan to maintain registration and avoid misalignment of the images. The beams may also be sagittally offset and still scanned on top of each other on different scans. The tangential offset of each laser emitter is generally given an upper limit of 300 μm since tangential offset does not introduce scan line bow up to that limit. The effect of tangential offset is to require delay in the electronic modulation signals to one of the dual beams relative to the other since one beam lags the other during scanning across the photoreceptor. One or more beams can be emitted at each wavelength. The raster output scanner could also use a dual wavelength monolithic semiconductor laser structure 18 where generally the offset between the two lasers will be purely sagittal. Light Emitting Diodes (LED) may also be employed The dual wavelength laser structure provides a substantially common spatial origin for each beam. Each beam is independently modulated so that it exposes its associated photoreceptor in accordance with a respective color image.

In the raster output scanner 16, the two laser beams 20 and 22 from the laser structure 18 are input to an achromatized (wavelength corrected) conventional beam input optical system 24 which collimates, conditions and focuses the beams onto an optical path such that they impinge on a rotating polygon mirror 26 having a plurality of facets 28. As the polygon mirror rotates, the facets cause the reflected beam to deflect repeatedly in the direction indicated by the arrow 30. The deflected laser beams are input to a single set of achromatized imaging and correction optics 32, which corrects for errors such as polygon angle error and wobble and focuses the beams onto the photoreceptor belt. The semiconductor laser beams are modulated by modulating the drive currents to each of the lasers.

As stated earlier, at exposure station B, the uniformly charged photoreceptor or charge retentive surface 4 is exposed to ROS 16 which causes the charge retentive surface to remain charged or to be discharged in accordance with the output from the scanning device.

Figure 2:
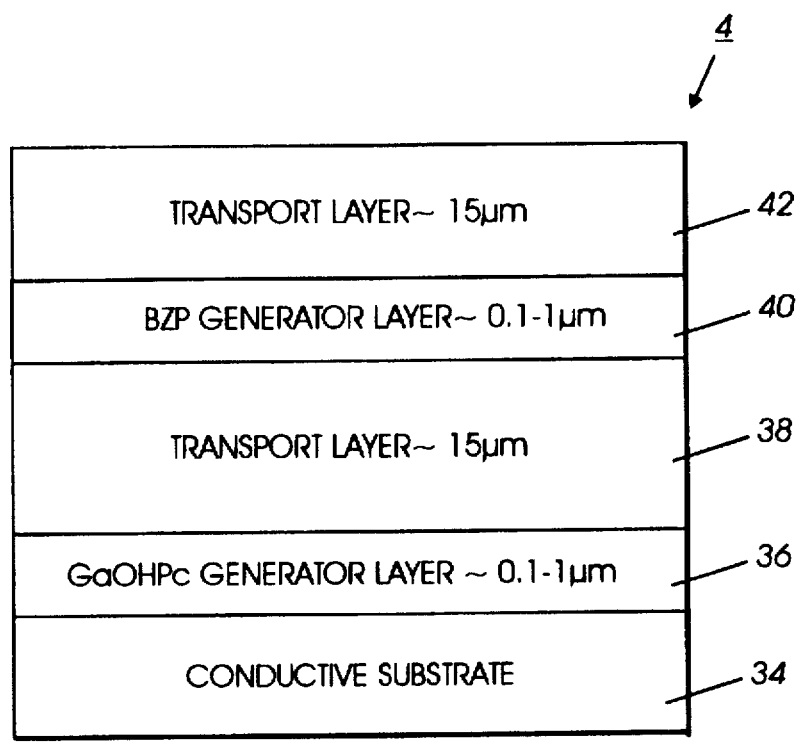
FIG. 2 is a schematic illustration of a dual layer photoreceptor belt for use in the two pass xerographic printing system of FIG. 1.

As illustrated in FIG. 2 the photoreceptor belt 4 consists of a flexible electrically conductive substrate 34. The substrate can be opaque, translucent, semi-transparent, or transparent, and can be of any suitable conductive material, including copper, brass, nickel, zinc, chromium, stainless steel, conductive plastics and rubbers, aluminum, semitransparent aluminum, steel, cadmium, silver, gold, paper rendered conductive by the inclusion of a suitable material therein or through conditioning in a humid atmosphere to ensure the presence of sufficient water content to render the material conductive, indium, tin, metal oxides, including tin oxide and indium tin oxide, and the like. In addition, the substrate can comprise an insulative layer with a conductive coating, such as vacuum-deposited metallization on plastic, such as titanized or aluminized Mylar™ polyester, wherein the metalized surface is in contact with the bottom photoreceptor layer or any other layer such as a charge injection blocking or adhesive layer situated between the substrate and the bottom photoreceptor layer. The substrate has any effective thickness, typically from about 6 to about 250 microns, and preferably from about 50 to about 200 microns, although the thickness can be outside of this range. The photoreceptor belt comprises a pair of photoreceptor structures each including a charge generation layer and a charge transport layer.

Adhered to the substrate 34 is a GaOHPc first or lower generator layer 36 approximately 0.1 to 1 μm thick, a first or lower transport layer 38 of N,N'-diphenyl-N,N'-bis(3"-methylphenyl)-(1,1'-biphenyl)-4,4'-diamine (TPD) in polycarbonate which is hole transporting and approximately 15 μm thick, a benzimidazole perylene (BZP) second or upper generator layer 40 approximately 0.1 to 1 μm thick, a second or upper transport layer 42 of TPD in polycarbonate which is hole transporting and approximately 15 μm thick.

The GaOHPc generator layer is thin enough to maintain low dark decay and the BZP generator layer is thick enough to be opaque to the wavelength used to discharge it. BZP is known to be coatable to opaque thicknesses while maintaining low dark decay.

For this illustrative example, the GaOHPc generator layer is infrared sensitive at 830 nm and the BZP generator layer is red sensitive at 670 nm. The opacity of BZP at 670 nm insures that this wavelength does not also discharge the underlying GaOHPc. On the other hand the BZP layer is transparent to 830 nm. Therefore this wavelength passes right through the BZP and discharges only the GaOHPc layer below. Therefore, each generator layer can only be accessed by one of the two wavelengths.

The generator and transport layers can be deposited or vacuum evaporated or solvent coated upon the substrate by means known to those of ordinary skill in the art.

Figure 3:
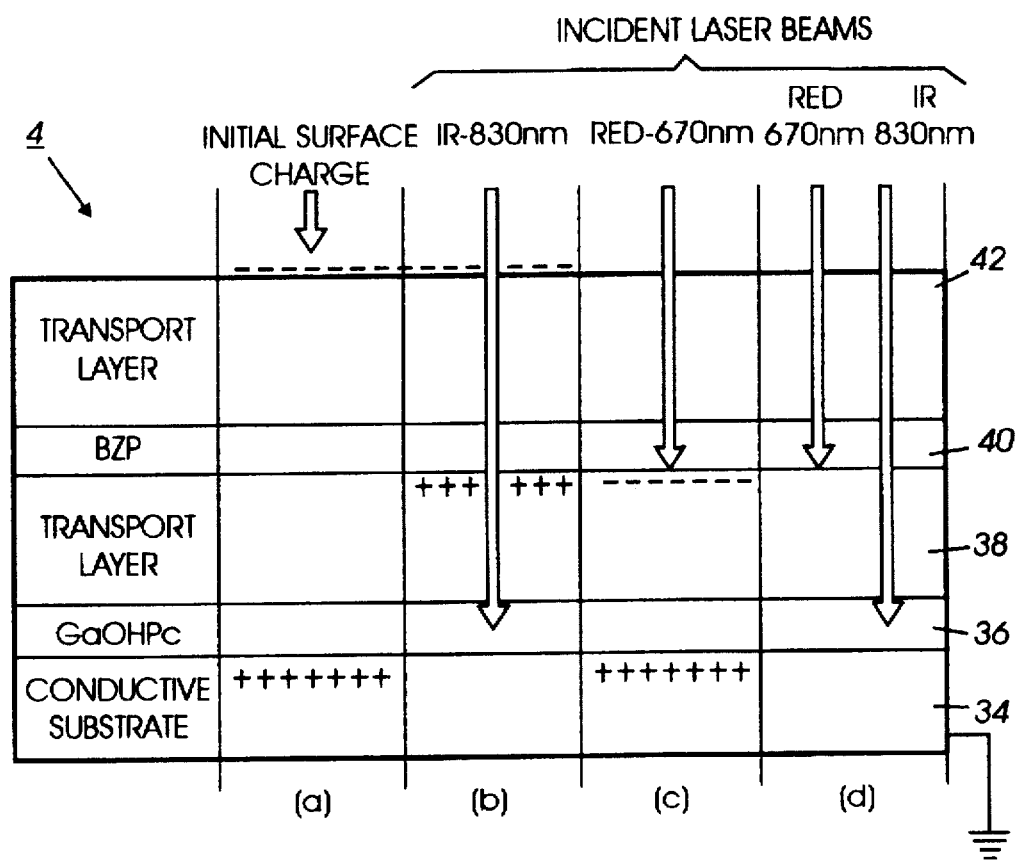
FIG. 3 is a schematic illustration of the state of the photoreceptor following initial exposure thereof.

During exposure of the photoreceptor belt 4 to the light beams from the ROS as shown in FIG. 3, the 670 nm wavelength of one modulated beam would be entirely absorbed in the opaque BZP generator layer. Exposure with the 670 nm beam would therefore discharge the BZP and upper transport layer 42. None of the 670 nm light beam would reach the GaOHPc layer so that it and the lower transport layer 36 would remain fully charged. The second wavelength is chosen to be 830nm to insure that it will pass completely through the BZP layer without effecting any discharge of that layer or upper transport layer 42. However, the GaOHPc layer is sensitive to 830 nm and exposure with this wavelength from a modulated beam will discharge that layer and the lower transport layer 36. The 830 nm exposure should not be allowed to effect discharge through the benzimidazole perylene layer and the upper transport layer.

As illustrated in FIG. 3, exposure of an area of the photoreceptor belt 4 to the both wavelengths or to only one of the wavelengths results in the photoreceptor being electrostatically conditioned as follows: (a) the unexposed areas which retain the original surface voltage, (b) areas exposed with the 830 nm beam which are discharged to roughly one-half of the original surface voltage, (c) areas exposed with the 670 nm beam which are also discharged to roughly one-half of the original photoreceptor voltage, $V_0$ and (d) the areas exposed with both the 830 and 670 nm wavelength beams which are fully discharged. While only three voltage levels are present on the photoreceptor immediately following exposure, there will be four distinctly different areas after xerographic development during the first pass of the photoreceptor through the process stations. While the surface voltages in regions (b) and (c) are roughly equal after exposure they have been formed in very distinct ways. During the development process the photoreceptor will remember how these voltages were formed to allow development in very different ways in the two regions.

The image area represented by (a) corresponds to the CAD portion of a trilevel image while the image area represented by (d) corresponds to the DAD portion of a tri-level image. The areas represented by (b) and (c) in FIG. 3 are at a voltage level corresponding to the background level of the tri-level image. Because of the way these images were formed the area (b) represents a second DAD image area which initially is not distinguishable from the background voltage level at (c). At the appropriate point in the imaging process, the second DAD image is rendered distinguishable so that it can be developed.

Figure 4A:
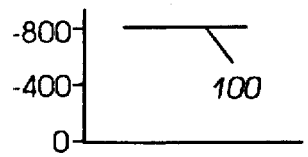
FIG. 4a is a plot of photoreceptor voltage versus location of a uniformly charged photoreceptor.

The process steps for printing all six primary colors of cyan (c), yellow (y), magenta (m), blue (b), green (g) and red (r), in addition to black (k) and white (w) during operation of the two-pass xerographic printing system of FIG. 1 will now be described. With the xerographic setup illustrated in FIG. 1, black, yellow and magenta images are formed in a first pass of the photoreceptor belt 4 through the process stations depicted therein. In practice, the photoreceptor is initially uniformly charged to a voltage level sufficiently high in order to allow for photoreceptor dark decay to $V_0$ equal to -800 in the elapsed time for the photoreceptor to move from the charging station A to the exposure station B. $V_0$ is represented by reference character 100 as shown in FIG. 4a.

Figure 4B:
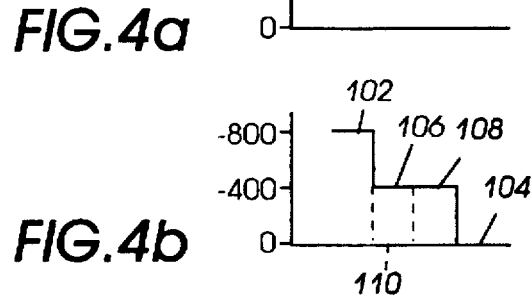
FIG. 4b is a plot of photoreceptor voltage versus location depicting the voltage profile of a tri-level image after an initial exposure step.
Figure 4C:
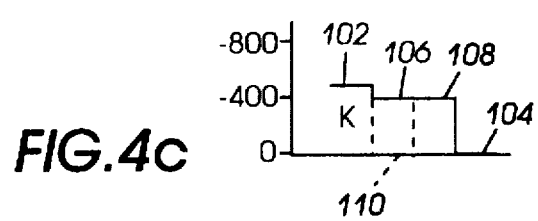
FIG. 4c is a plot of photoreceptor voltage versus location showing the state of the photoreceptor after development of the CAD image with black toner.
Figure 4D:
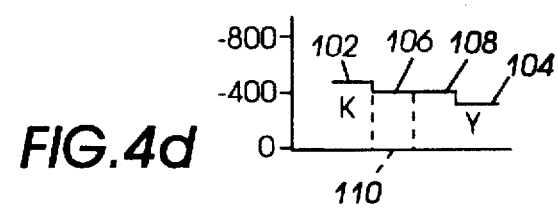
FIG. 4d is a plot of photoreceptor voltage versus location showing the state of the photoreceptor after development of the DAD image with yellow toner
Figure 4E:
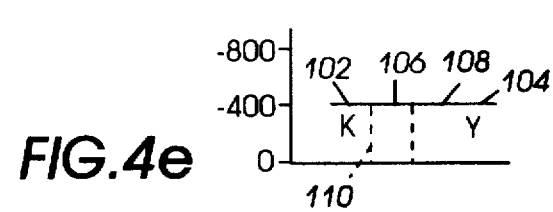
FIG. 4e is a plot of photoreceptor voltage versus location showing the state of the photoreceptor following a voltage leveling step.
Figure 4F:
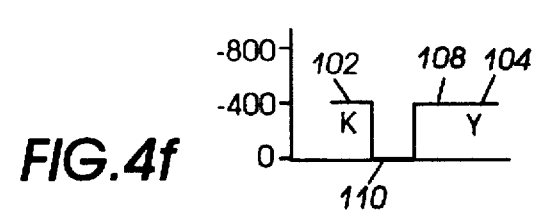
FIG. 4f is a plot of photoreceptor voltage versus location showing the state of the photoreceptor after flood exposure of the photoreceptor with blue light to form a second DAD image.

Exposure of the uniformly charged photoreceptor 4, at exposure station B during the first pass, results in the voltage profile shown FIG. 4b. As shown therein, the voltage profile initially comprises, unipolar, three voltage level images represented by the unexposed CAD image area 102, exposed DAD image area 104 created using both the 670 and 830 nm wavelength beams and the background areas 106 and 108 exposed, one at the 830 nm wavelength and one at 670 nm wavelength. An indistinguishable, second DAD image 110 is also formed at this point.

At the development station C (FIG. 1), the -800 volt unexposed or nondischarged (CAD) areas 102 are developed with Infrared (IR) transmissive black toner, k (FIG. 4c) using a Conductive Magnetic Brush (CMB) developer system 44. For this purpose, the developer system 44 is electrically biased at about -500 volts.

Next the photoreceptor is moved past a CMB developer housing 46 at development station D (FIG. 1). Here yellow toner, y is deposited onto the DAD image areas 104 (FIG. 4d) which are at the residual voltage level of the photoreceptor due to the exposure with both the 830 and 670 nm wavelength beams. The developer housing 46 is electrically biased at -300 volts.

The photoreceptor then moves past a developer housing 48 at development station E which is disengaged from its development zone since it contains cyan toner, c which is not used during the first pass of the two pass imaging process. The voltage levels in the developed CAD and DAD image areas are leveled to the background voltage using a suitable corona discharge device 50 at voltage leveling station F.

Figure 4G:
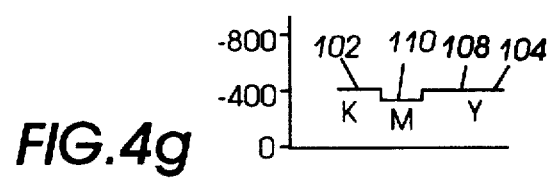
FIG. 4g is a plot of photoreceptor voltage versus location showing the state of the photoreceptor after development the second DAD image with magenta toner

The aforementioned indistinguishable or second DAD image 110 is now rendered distinguishable (FIG. 4f) such that it can be developed using magenta toner, m contained in a fourth development housing 54 at the development station H. This is accomplished using the blue light component of a combination red and blue food lamp structure 52. As the portions of the photoreceptor containing images 110 move past the developer housing structure 54, magenta toner, m is deposited thereon (FIG. 4g).

Movement of the photoreceptor past a pretransfer device 60 at the pretransfer station I is effected without pretransfer treatment since the pretransfer corotron is not activated during the first pass. Likewise, the photoreceptor moves past a transfer corona device 64 at transfer station J and a residual toner removal system 58 positioned at cleaning station L without image transfer and without photoreceptor cleaning being effected.

At the erase station M, the photoreceptor is subjected to white light illumination from a lamp 56 for erasing the photoreceptor. This is followed by recharging of the photoreceptor with the corona device 14 at the charging station A. The flood illumination and recharge steps serve to return the voltage level of the photoreceptor to the original -800 volts (FIG. 4h) pursuant to image creation during the second pass of the full color imaging process.

Figure 4H:
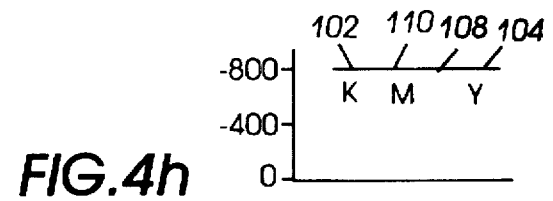
FIG. 4h is a plot of photoreceptor voltage versus location showing the state of the photoreceptor after blanket exposure with white light and recharging of the photoreceptor to approximately −800 volts.

Thus, after the development of black, magenta and yellow images on the photoreceptor 4 during the first imaging pass, and after the aforementioned erase and recharging steps, the photoreceptor contains black, yellow and magenta images, and also untoned white areas, all at -800 volts (FIG. 4h).

Exposure of the photoreceptor in this state to the dual wavelength ROS 16, without the application of novel aspects of the present invention, would result in four tri-level images being formed, for each of the developed image areas (i.e., black, magenta and yellow) and for the non-developed images areas of the photoreceptor. Thus, the photoreceptor would, without practicing the invention, contain black image areas, magenta image areas, yellow image areas and non-developed areas at the CAD voltage level of -800 volts, at the background level of -400 volts and at the DAD voltage level of 0 volts. This would preclude the use of NID for development of cyan and magenta images during the second pass of the imaging process because some components of the tri-level images would present fringe fields to the cyan and magenta developer housings which are used to develop DAD images during the second pass. For example, any image at the -800 volt level such as the black, yellow and magenta images would contain fringe fields which would undergo unwanted edge development. Also, since it is undesirable to add toner to certain of the image areas formed on the first pass such as the black image areas. Likewise, it is undesirable to deposit magenta on magenta images created in the first pass.

Accordingly, pursuant to the present invention during the second pass, tri-level images are not formed using the black toner images at -800 volts. Instead all of the -800 volt black image areas are reduced to the background voltage of -400 volts volts, reference character 120, using the ROS 16 so that they can neither be redeveloped nor present fringe fields to the DAD developer housings when passing there through (4i). Developer housings used during the first pass are disabled.

Figure 4I:
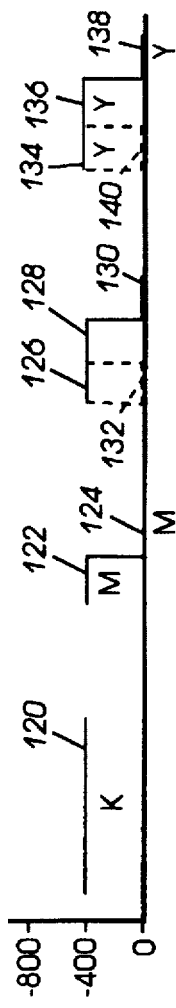
FIG. 4i is a plot of photoreceptor voltage versus location showing the state of the photoreceptor after a photoreceptor exposure pursuant the second pass of the photoreceptor through the xerographic processing stations.

Instead of forming tri-level images in the magenta areas, those areas are reduced to either the background voltage level 122 using the 670 nm wavelength beam or to the residual or DAD image area, 124 equal to 0 volts using both the 830 nm and 670 nm wavelength beams (second voltage profile FIG. 4i).

The -800 volt undeveloped voltage areas on the photoreceptor in FIG. 4h are reduced to -400 volt level at 126 and 128 using the 830 nm and 670 nm wavelength beams and to DAD or 0 volt level 130 using both the 830 nm and 670 nm wavelength beams (FIG. 4i). Non-developable image 132 is also created at this time.

In the same manner, the −800 volt yellow image areas are used to form background areas 134 and 136 using the 830 nm and 670 nm wavelength beams and to the 0 volt level to form the DAD image, 138 using both the 830 nm and 670 nm wavelength beams. Non-developable image 140 is also created at this time.

During the second pass cyan (c) and magenta (m) toners are used to create blue (b), green (g), red (r) and magenta (m) images. Thus, cyan toner is deposited on yellow images created during the first pass resulting in green images. Magenta toner is deposited on yellow images created in the first pass resulting in red images and cyan toner is deposited on magenta images created during the first pass resulting in blue images.

Figure 4J:
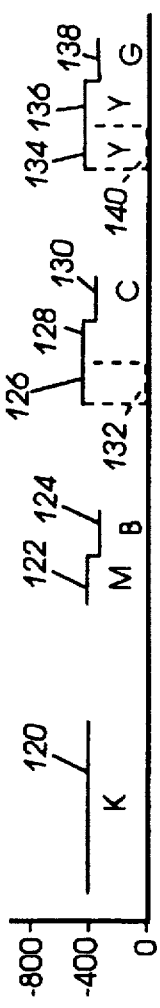
FIG. 4j is a plot of photoreceptor voltage versus location showing the state of the photoreceptor after deposition of cyan toner in image configuration onto untoned areas and onto magenta and yellow images formed in the first pass.

During the second pass of the imaging process, the black and yellow developer housings 44 and 46 are disengaged. These developer housings can be disabled by retracting them from their respective developer zones or in any other suitable manner. As the magenta, DAD image 124 of FIG. 4i passes through the cyan developer housing 48, cyan toner is deposited thereon thereby forming blue image areas (FIG. 4j). The DAD undeveloped areas 130 of the photoreceptor are developed with cyan toner as are the DAD yellow image areas 138, FIG. 4j.

Figure 4K:
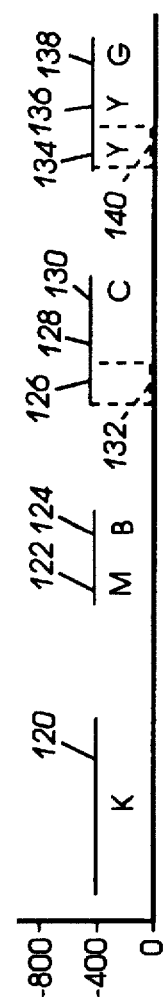
FIG. 4k is a plot of photoreceptor voltage versus location showing the state of the photoreceptor after another recharge step.
Figure 4L:
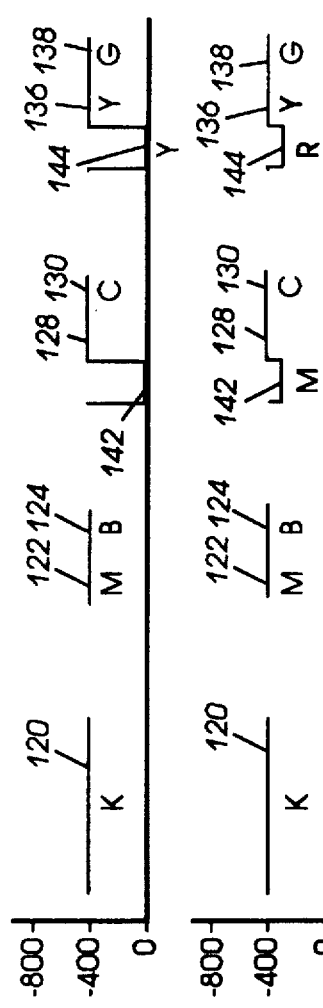
FIG. 4l is a plot of photoreceptor voltage versus location showing the state of the photoreceptor after flood exposure of the photoreceptor with red light to form another DAD image.
Figure 4M:
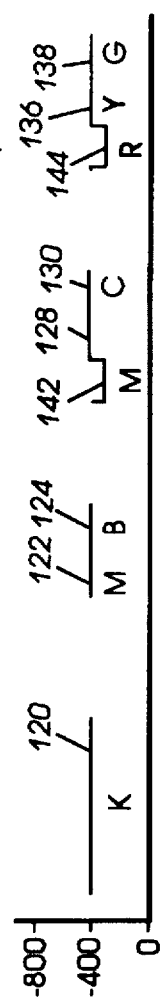
FIG. 4m is a plot of photoreceptor voltage versus location showing the state of the photoreceptor after development of the DAD image of FIG. 4l with magenta toner.

Following the creation of the cyan, green and blue toner images in the step illustrated in 4j, these are voltage leveled to the background voltage level of −400 volts, FIG. 4k. Then the photoreceptor is flood exposed with red light using the combination blue/red lamp 52, FIG. 4l. This flood exposure step serves to condition the indistinguishable DAD images, 132 and 140 such that they are rendered developable images 142 and 144 to be developed with magenta toner. In the case of the DAD image 142, those images are developed with magenta toner and in the case of the DAD images 144 those images are developed with the magenta toner to form red images.

Figure 4N:
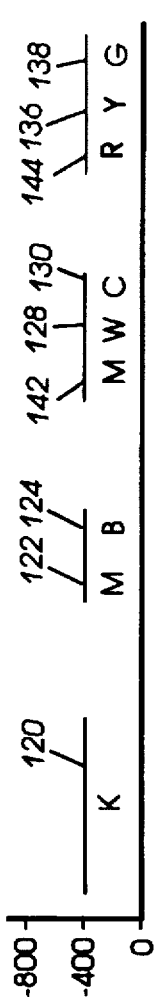
FIG. 4n is a plot of photoreceptor voltage versus location showing the state of the photoreceptor after pretransfer charging of the photoreceptor and images contained thereon.
Figure 5:
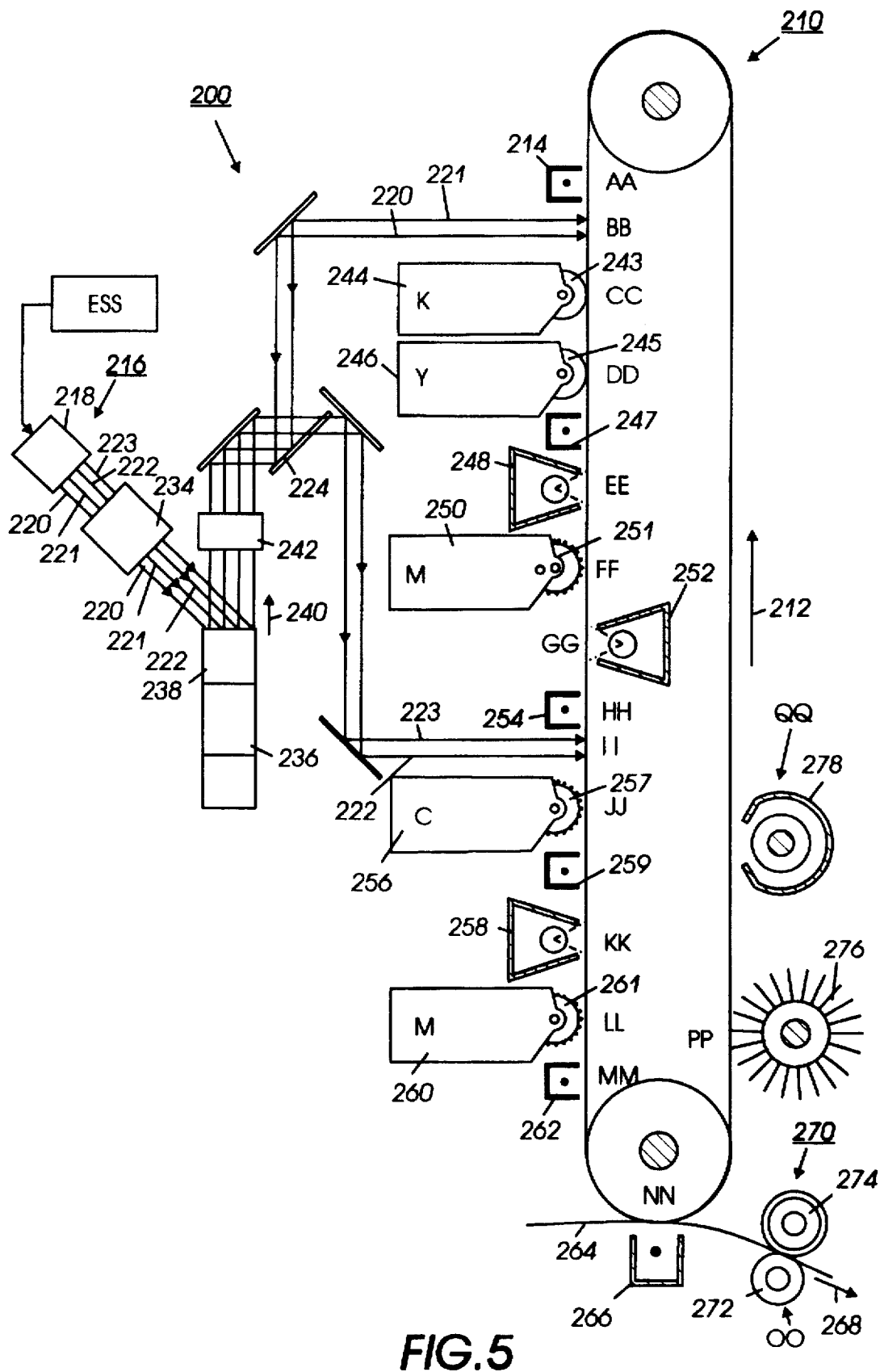
FIG. 5 is a schematic illustration of a single pass imaging system.

A xerographic imaging system 200 for creation of full color images in a single pass using black, magenta, cyan and yellow toners and Non-Interactive Development without fringe field development is illustrated in FIG. 5. The voltage profiles for the images created in a single pass are the same as illustrated in FIGS. 4a through 4n.

The xerographic imaging system 200 illustrated in FIG. 5 comprises a photoconductive belt 210 consisting of two photoconductive layers and an electrically conductive substrate. The belt 210 moves in the direction of arrow 212 to advance successive portions of the belt sequentially through the various processing stations AA–QQ disposed about the path of the process stations. The belt 210 is entrained about a plurality of rollers one of which can be used as a drive roller and the other of which can be used to provide suitable tensioning of the photoreceptor belt 210. A motor (not shown) rotates the drive roller to advance the belt 210 in the direction of arrow 212. The drive roller can be coupled to the motor by suitable means such as a belt drive.

As can be seen by further reference to FIG. 5, initially successive portions of belt 210 pass through charging station M, where a corona discharge device such as a scorotron, corotron, or dicorotron, indicated generally by the reference numeral 214, charges the belt 210 to a selectively high uniform positive or negative potential, $V_0$. Any suitable control circuit, as well known in the art, may be employed for controlling the corona discharge device 214.

Next, the charged portions of the photoreceptor surface are advanced through the first exposure station BB where the uniformly charged photoreceptor or charge retentive surface 210 is exposed to a raster output scanning device 216 which causes the charge retentive surface to remain charged or to be discharged in accordance with the output from the scanning device. An Electronic Subsystem (ESS) 217 converts previously stored images into the appropriate control signals for the ROS to develop the photoreceptor in an imagewise fashion. Image data acquisition, data storage, and computation under the control of the ESS 217 are well within the capabilities of present and future microprocessor-based machine controllers and do not part of the invention.

The raster output scanner 216 can use a dual wavelength hybrid laser semiconductor structure 218 consisting of a 670 nm wavelength laser emitter such as a semiconductor structure of AlGaInP/GaAs which emits two beams, one of TE polarization and one of TM polarization, and a 830 nm laser emitter such as a semiconductor structure of AlGaAs/GaAs which emits two beams, one of TE polarization and one of TM polarization, both laser emitter structures being known to those of ordinary skill in the art. The four beams of two wavelengths and two polarizations could also be produced from a monolithic semiconductor laser structure. Light Emitting Diodes (LED) may also be employed In the raster output scanner 216, the four bundled laser beams 220, 221, 222 and 223 from the laser structure 218 are split into two pairs of separated beams based on polarization by polarization beam splitter 224. Thus, beam 220 (at 670 nm and TE polarized) and beam 221 (at 830 nm and TE polarized) are sent to first exposure and imaging station BB to effect the first exposure. Beam 222 (at 670 nm and TM polarized) and beam 223 (at 830 nm and TM polarized) are sent to second exposure and imaging station II to effect the second exposure.

These four beams 220, 221, 222 and 223 are input to a conventional input optical system 234 which collimates, conditions and focuses the beams onto an optical path such that they illuminate a rotating polygon mirror 236 having a plurality of facets 238. As the polygon mirror rotates, the facets cause the reflected beam to deflect repeatedly in the direction indicated by the arrow 240. The four deflected laser beams are input to a single set of imaging and correction optics 242, which corrects for errors such as polygon angle error and wobble and focuses the beams onto the photoreceptor belt at first exposure station BB and second exposure station II. The output beams of the semiconductor lasers are modulated by modulating the drive current to each of the lasers.

At first exposure station BB, the uniformly charged photoreceptor or charge retentive surface 210 is exposed to the TE polarized modulated beams 220 and 221 of the raster output scanning device 216 which causes the charge retentive surface to remain charged or to be discharged in accordance with the output from the scanning device. The photoreceptor belt 210 of the single pass xerographic printing system 200 of FIG. 5 is the same as the photoreceptor belt 10 of the double pass xerographic printing system 2 of FIGS. 1 and 2.

The steps in the full color development process of the single pass xerographic printing system of FIG. 5, are: first, charging of the photoreceptor belt; second, exposing of the photoreceptor belt to the two modulated laser beams of different wavelengths but the same polarization; third, CAD development with black toner; fourth, DAD development with yellow toner; fifth, voltage leveling the voltages associated with the black and yellow images, sixth, blanket exposure of the photoreceptor belt with blue light to form a DAD image; seventh, DAD development of the DAD image created with the blue light exposure with magenta toner; eighth, blanket exposure of the photoreceptor belt with white light for electrostatic erasure thereof; ninth, recharging of the photoreceptor belt; tenth, exposure of the photoreceptor belt to the two modulated laser beams of different wavelengths but the same polarization; eleventh, DAD development of magenta, yellow and untoned images with cyan toner to form blue, green and cyan images; twelfth, voltage leveling of the blue, green and cyan images, thirteenth, blanket exposure of the photoreceptor belt with red light; fourteenth, DAD development of un-developed image areas and yellow images with magenta toner to form magenta and red images, and fifteenth, pretransfer charging of the photoreceptor. The single pass xerographic printing system of FIG. 5 creates all six primary colors of cyan, yellow, magenta, blue, green and red, in addition to black and white.

After charging at charging station M and exposure with the ROS at exposure station BB; a development system CC, indicated generally by the reference numeral 244, deposits black toner onto CAD electrostatic latent images on photoreceptor 210. The development system 244 comprises a developer housing which contains one or more magnetic brush rollers 243. Electrical biasing is accomplished via a power supply, electrically connected to the developer apparatus. A suitable DC bias voltage of −500 volts is applied to the rollers and the developer housing via the power supply.

At development station DD, a development system, indicated generally by the reference numeral 246, advances developer materials into contact with DAD electrostatic latent images. The development system 246 comprises a developer housing containing one or more magnetic brush rollers 245. The rollers deposit developer material on the DAD image areas. The developer material, by way of example, contains yellow toner which will be negatively charged for a negatively charged photoreceptor. Appropriate electrical biasing is accomplished via a power supply electrically connected to the developer apparatus. A suitable DC bias of −300 volts is applied to the rollers and to the developer housing via the bias power supply.

Next, voltage leveling of the black and yellow images is effected using a corona discharge device 247 followed by a non-imagewise uniform blanket exposure at exposure station EE with a well controlled blue light source such as a fluorescent lamp 248, as shown in FIG. 5.

At development station FF, a development system, indicated generally by the reference numeral 250, advances developer materials into contact with the DAD electrostatic latent images formed during exposure at the exposure EE. The non-interactive development system 250 comprises a developer housing containing roller 251 and magenta toner. Appropriate electrical biasing is accomplished via a power supply electrically connected to the developer apparatus. A suitable DC bias, −300 volts is applied to the rollers and to the developer housing via the bias power supply.

Next, a non-imagewise uniform blanket exposure of white light is applied to the photoreceptor at erasure station GG with a well controlled light source such as a fluorescent or incandescent lamp 252. The erasure exposure station GG generally gives out a broad band of white light as opposed to the uniform exposure stations which usually give out only one color (a narrower band) of light.

The white light erases all of the electric fields within the photoreceptor under the black, magenta, yellow and white areas so these areas can be recharged to approximately −800 volts so that a uniform field is again applied across the dual layer photoreceptor in preparation for subsequent imaging, development and uniform exposure steps.

The belt 210 then passes through the charging station HH, where a corona discharge device such as a scorotron, corotron, or dicorotron, indicated generally by the reference numeral 254, charges the belt 210 to a selectively high uniform positive or negative potential, $V_0$.

Next, the charged portions of the photoreceptor surface are advanced through the exposure station II. At exposure station II, the uniformly charged photoreceptor or charge retentive surface 210 is exposed to the TM polarized modulated beams 222 and 223 of the raster output scanning device 216 which causes the charge retentive surface to remain charged or to be discharged in accordance with the output from the scanning device. The resulting voltage patterns are the same as those found in FIG. 4i. The semiconductor laser beams are modulated by modulating the drive current to each of the lasers. Thus, the −800 volt images are conditioned using the dual-wavelength such that there are no images formed which would present fringe fields to the DAD developer housings when developing cyan and magenta images.

At development station JJ, a development system, indicated generally by the reference numeral 256, deposits cyan toner on an untoned region and on the DAD magenta and yellow images formed during the exposure step at exposure station II thereby creating cyan, blue and green images. The development system 256 comprises a Non-Interactive developer housing which contains an electroded donor roller 257 for conveying the cyan toner to a development zone between the donor roller and the photoreceptor. A suitable DC bias is applied to the roller via a bias power supply.

Next, voltage leveling of the blue, green and cyan images is effected using a corona discharge device 259 followed by non-imagewise uniform blanket exposure of the photoreceptor with red light at exposure station KK with a well controlled light source such as a fluorescent lamp 258.

At development station LL, a Non-Interactive Development (NID) system, indicated generally by the reference numeral 260, deposits magenta toner on undeveloped photoreceptor areas and yellow image areas to form magenta and red images. The development system contains one or more electroded donor rollers 261. Appropriate electrical biasing is accomplished via a power supply electrically connected to the developer apparatus. A suitable DC bias is applied to the rollers and to the developer housing via the bias power supply.

Because the composite image developed on the photoreceptor in both the single and two pass systems consists of both positive and negative toner, a typically positive pretransfer corona charging members 60 (FIG. 1) and 262 (FIG. 5), disposed at pre-transfer charging stations I and MM, are provided to condition the toner for effective transfer to a substrate using positive corona charge. The pretransfer corona charging member is preferably an AC corona device biased with a DC voltage to operate in a field sensitive mode and to perform tri-level xerography pre-transfer charging in a way that selectively adds more charge (or at least comparable charge) to the parts of the image that must have their polarity reversed. This charge discrimination may be enhanced by discharging the photoreceptor carrying the composite developed latent image with light before the pre-transfer charging begins. Furthermore, flooding the photoreceptor with light coincident with the pre-transfer charging minimizes the tendency to overcharge portions of the image which are already at the correct polarity.

A sheet of support material 264 is moved into contact with the toner image at transfer station NN. The sheet of support material is advanced to transfer station by a conventional sheet feeding apparatus, not shown. Preferably, the sheet feeding apparatus includes a feed roll contacting the uppermost sheet of a stack copy sheets. Feed rolls rotate to advance the uppermost sheet from a stack into a chute which directs the advancing sheet of support material into contact with photoconductive surface of belt 210 in a timed sequence, so that the developed toner powder image contacts the advancing sheet of support material at transfer station NN.

The transfer station includes a corona generating device 266 which sprays ions of a suitable polarity onto the backside of sheet 264. This attracts the charged toner powder images from the belt 210 to sheet 264. After transfer, the sheet continues to move, in the direction of arrow 268, onto a conveyor (not shown) which advances the sheet to fusing station OO.

The fusing station includes a fuser assembly, indicated generally by the reference numeral 270, which permanently affixes the transferred powder image to sheet 264. Preferably, fuser assembly 270 comprises a heated fuser roller 274 and a backup roller 272. Sheet 264 passes between fuser roller 274 and backup roller 272 with the toner powder image contacting fuser roller 274. In this manner, the toner powder image is permanently affixed to sheet 264. After fusing, a chute, not shown, guides the advancing sheet 264 to a catch tray, also not shown, for subsequent removal from the printing machine by the operator.

After the sheet of support material is separated from photoconductive surface of belt 210 the residual toner particles carried on the photoconductive surface are removed therefrom. These particles are removed at cleaning station PP. A magnetic brush cleaner housing is disposed at the cleaner station. The cleaner apparatus 276 comprises a conventional magnetic brush roll structure for causing carrier particles in the cleaner housing to form a brush-like orientation relative to the roll structure and the charge retentive surface. It also includes a pair of detoning rolls for removing the residual toner from the brush.

At erase station QQ, erase lamp 278 erases any residual voltage on the photoreceptor prior to the next imaging cycle.

We claim:

1. A method of creating full color images using IOI development on a charge retentive structure, said method including the steps of:

a. uniformly charging said charge retentive structure to a predetermined voltage level;

b. using an exposure device, creating tri-level latent electrostatic images comprising developable CAD images at a first voltage level, developable DAD images at a second voltage level, non-developable DAD images and background areas at a third voltage level;

c. rendering said CAD and DAD images visible with marking particles to thereby form areas of first and second color images on said charge retentive structure, d. voltage leveling said CAD and DAD images to said background voltage level;

e. conditioning said non-developable DAD image to produce another developable DAD image;

f. developing said another developable DAD image;

g. flood illuminating said charge retentive structure with white light;

h. recharging said charge retentive surface to a predetermined voltage level;

i. reducing the voltage levels associated with said developed CAD and DAD images and un-developed areas of said charge retentive structure to thereby form immediately developable DAD images and yet another non developable DAD image;

j. reducing the remainder of the voltages associated with said developed CAD and DAD images to the voltage level of said background areas;

k. rendering visible said immediately developable DAD images formed by reducing the voltage levels associated with said CAD and DAD images and undeveloped image areas;

l. voltage leveling said DAD images rendered visible in step k;

m. conditioning said charge retentive structure for converting said yet another non-developable DAD image to still another developable DAD image;

n. developing said still another non-developable DAD image o. pretransfer charging said charge retentive structure; and p. transferring said images to a final substrate.

2. The method according to claim 1 wherein said steps of reducing in i and j are effected using said exposure device.

3. The method according to claim 2 wherein said exposure device comprises a ROS.

4. The method according to claim 3 wherein step e is effected by flood exposing said charge retentive structure with blue light.

5. The method according to claim 4 wherein step m is effected by flood exposing said charge retentive structure with red light.

6. The method according to claim 5 wherein said charge retentive structure comprises a dual layer photoreceptor.

7. The method according to claim 6 wherein said dual layer photoreceptor is responsive to wavelengths of 830 and 670 nm.

8. The method according to claim 7 wherein said step of forming a tri-level image is effected using a ROS comprising a dual beam laser diode source wherein said beams are at wavelengths of 830 and 670 nm.

9. The method according to claim 8 wherein said step of creating tri-level images comprises creating said background area intermediate said CAD and DAD images.

10. The method according to claim 1 wherein said step of forming a tri-level image is effected using a ROS comprising a dual beam laser diode source wherein said beams are at wavelengths of 830 and 670 nm.

11. Apparatus for creating full color images using IOI development on a charge retentive structure, said apparatus comprising:

a. means for uniformly charging said charge retentive structure to a predetermined voltage level;

b. exposure means for creating tri-level latent electrostatic images comprising developable CAD images at a first voltage level, developable DAD images at a second voltage level, non-developable DAD images and background areas at a third voltage level;

c. means for rendering said CAD and DAD images visible with marking particles to thereby form areas of first and second color images on said charge retentive structure, d. means for voltage leveling said CAD and DAD images to said background voltage level;

e. means for conditioning said non-developable DAD image to produce another developable DAD image;

f. means for developing said another developable DAD image;

g. means for flood illuminating said charge retentive structure with white light;

h. means for recharging said charge retentive surface to a predetermined voltage level;

i. means for reducing the voltage levels associated with said developed CAD and DAD images and un-developed areas of said charge retentive structure to thereby form immediately developable DAD images and yet another non-developable DAD image;

j. means for reducing the remainder of the voltages associated with said developed CAD and DAD images to the voltage level of said background areas;

k. means for rendering visible said immediately developable DAD images formed by reducing the voltage levels associated with said CAD and DAD images and un-developed image areas;

l. means for voltage leveling said DAD images rendered visible in step k;

m. means for conditioning said charge retentive structure for converting said yet another non-developable DAD image to still another developable DAD image;

n. means for developing said still another non-developable DAD image o. means for pretransfer charging said charge retentive structure; and p. means for transferring said images to a final substrate.

12. Apparatus according to claim 11 wherein said means for reducing voltages in i and j comprises said exposure device.

13. Apparatus according to claim 12 wherein said exposure device comprises a ROS.

14. Apparatus according to claim 13 wherein means for conditioning said non-developable DAD image to produce another developable DAD image comprises a blue exposure device.

15. Apparatus according to claim 14 wherein said means for conditioning said charge retentive structure for converting said yet another non-developable DAD image to still another developable DAD image comprises a red exposure device.

16. Apparatus according to claim 15 wherein said charge retentive structure comprises a dual layer photoreceptor.

17. Apparatus according to claim 16 wherein said dual layer photoreceptor is responsive to wavelengths of 830 and 670 nm.

18. Apparatus according to claim 17 wherein said step of forming a tri-level image is effected using a ROS comprising a dual beam laser diode source wherein said beams are at wavelengths of 830 and 670 nm.

19. Apparatus according to claim 18 wherein said step of creating tri-level images comprises creating said background area intermediate said CAD and DAD images.

20. Apparatus according to claim 11 wherein said step of forming a tri-level image is effected using a ROS comprising a dual beam laser diode source wherein said beams are at wavelengths of 830 and 670 nm.

* * * * *